US011009397B2

(12) United States Patent
Mercuro et al.

(10) Patent No.: US 11,009,397 B2
(45) Date of Patent: May 18, 2021

(54) COMPACT TWO-DIMENSIONAL SPECTROMETER

(71) Applicant: Rigaku Analytical Devices, Inc., Wilmington, MA (US)

(72) Inventors: David Steven Mercuro, Windham, NH (US); Michael Anthony Damento, Tucson, AZ (US); Stanislaw Piorek, Hillsborough, NJ (US)

(73) Assignee: Rigaku Analytical Devices, Inc., Willmington, MA (US)

( * ) Notice: Subject to any disclaimer, the term of this patent is extended or adjusted under 35 U.S.C. 154(b) by 0 days.

(21) Appl. No.: 16/163,037

(22) Filed: Oct. 17, 2018

(65) Prior Publication Data

US 2020/0124476 A1   Apr. 23, 2020

(51) Int. Cl.
*G01J 3/28*   (2006.01)
*G01J 3/18*   (2006.01)
(Continued)

(52) U.S. Cl.
CPC .......... *G01J 3/2823* (2013.01); *G01J 3/0208* (2013.01); *G01J 3/0221* (2013.01); *G01J 3/0256* (2013.01);
(Continued)

(58) Field of Classification Search
CPC .................. G01J 2003/1208; G01J 3/1809
See application file for complete search history.

(56) References Cited

U.S. PATENT DOCUMENTS

| 4,995,721 A * | 2/1991 | Krupa | G01J 3/1809 |
| | | | 356/305 |
| 5,018,856 A * | 5/1991 | Harnly | G01J 3/1809 |
| | | | 356/305 |

(Continued)

FOREIGN PATENT DOCUMENTS

| EP | 2884247 A1 | 6/2015 |
| JP | 2000258249 A | 9/2000 |
| WO | WO 2006/077106 A1 | 7/2006 |

OTHER PUBLICATIONS

Pavlov et all, "Miniaturized laser-induced plasma spectrometry for planetary in situ analysis The case for Jupiters moon Europa", Advances in Space Research, Elsevier, Amsterdam, NL, vol. 48, No. 4, Jun. 21, 2010 (Jun. 21, 2010), pp. 764-778, XP028236230, ISSN: 0273-1177, DOI: 10.1016/J.ASR.2010.06.034 (Year: 2010).*

(Continued)

*Primary Examiner* — Violeta A Prieto
(74) *Attorney, Agent, or Firm* — Brinks Gilson & Lione

(57) ABSTRACT

A two-dimensional spectrometer includes a first mirror, a prism, a diffraction grating, a lens, a second mirror, and a two-dimensional sensor. The first mirror is configured to receive the optical signal from the optical entrance and reflect the optical signal towards the prism. After passing through the prism, the optical signal is provided to the diffraction grating. The diffraction grating diffracts the optical signal so as to generate a diffracted optical signal which is directed back through to prism, wherein the lens configured focuses the diffracted optical signal onto the second mirror. The second mirror reflects the diffracted optical signal back through the lens which focuses the diffracted optical signal onto the two-dimensional sensor. The diffraction grating may be an echelle grating.

17 Claims, 3 Drawing Sheets

(51) Int. Cl.
*G01J 3/02* (2006.01)
*G01J 3/51* (2006.01)
*G01J 3/14* (2006.01)
*G01J 3/12* (2006.01)

(52) U.S. Cl.
CPC . G01J 3/14 (2013.01); G01J 3/18 (2013.01); G01J 3/1809 (2013.01); G01J 3/513 (2013.01); *G01J 2003/1208* (2013.01)

(56) References Cited

U.S. PATENT DOCUMENTS

| | | | | |
|---|---|---|---|---|
| 5,189,486 | A * | 2/1993 | Florek | G01J 3/1809 356/328 |
| 6,628,383 | B1 * | 9/2003 | Hilliard | G01J 3/18 356/305 |
| 10,288,481 | B2 * | 5/2019 | Day | G01J 3/0291 |
| 2017/0016767 | A1 * | 1/2017 | Day | G01J 3/0291 |
| 2019/0339123 | A1 * | 11/2019 | Farsad | G01J 3/14 |
| 2020/0116643 | A1 * | 4/2020 | Kun | G01N 21/274 |
| 2020/0124536 | A1 * | 4/2020 | Damento | G01J 3/0272 |
| 2020/0408595 | A1 * | 12/2020 | Farsad | G01J 3/021 |

OTHER PUBLICATIONS

ARYELLE400 Spectrometers (http://www.ltb-berlin.de//assets/uploads/aryelle400butterfly_datasheet.pdf, https://web.archive.org/web/20100905124203/http://www.photonicsolutions.co.uk/product.asp?prodid=SPCLTBAryelle ). (Year: 2010).*

Bauer, H.E., et al., "Laser Induced breakdown spectrometry with an échelle spectrometer and intensified charge coupled device detection," Spectrochimica Acta. Part B: Atomic Spectroscopy, vol. 53, No. 13, Nov. 1, 1998, pp. 1815-1825.

International Search Report for corresponding International Patent Application PCT/US2019/055354, dated Jan. 21, 2020.

Spano, P., et al., "The optical design of X-Shooter for the VLT," Proc. of SPIE, vol. 6269, Jun. 14, 2006, pp. 62692X-1-62692X-8.

Written Opinion of the International Searching Authority for corresponding International Patent Application PCT/US2019/055354, dated Jan. 21, 2020.

* cited by examiner

US 11,009,397 B2

COMPACT TWO-DIMENSIONAL SPECTROMETER

BACKGROUND

1. Field of the Invention

The present invention generally relates to two-dimensional spectrometers.

2. Description of Related Art

Laser-induced breakdown spectroscopy ("LIBS") is a type of atomic emission spectroscopy which uses a highly energetic laser pulse as the excitation source. The laser is focused to form a plasma, which atomizes and excites samples. In principle, LIBS can analyze any matter regardless of its physical state, be it solid, liquid, or gas. Because all elements emit light of characteristic frequencies when excited to sufficiently high temperatures, LIBS can detect all elements, limited only by the power of the laser beam utilized as well as the sensitivity and wavelength range of the spectrograph and detector.

LIBS operate by focusing the laser beam onto a small area at the surface of the specimen. When the laser beam is discharged it ablates a very small amount of material, in the range of nanograms to picograms, which generates a plasma plume with temperatures in excess of 100,000 K. During data collection, typically after local thermodynamic equilibrium is established, plasma temperatures range from 5,000-20,000 K. At the high temperatures during the early plasma, the ablated material dissociates (breaks down) into excited ionic and atomic species. During this time, the plasma emits a continuum of radiation which does not contain any useful information about the species present, but within a very small timeframe the plasma expands at supersonic velocities and cools. At this point, the characteristic atomic emission lines of the elements can be observed.

However, LIBS systems require the use of a spectrometer. The purpose of the spectrometer is to receive the plasma emitted light reflected by the sample and provide this plasma emitted light through the use of a number of different optical devices to a sensor which can then generate electrical signals that can be interpreted by a digital analyzer so as to perform one or more analyses of this generated electrical signal by the spectrometer. Generally, spectrometers may be single dimensional or may be two-dimensional. Single dimensional spectrometers have some advantages in that they can generally be rather small in size. However, their resolution is limited, and the type of information generated by the spectrometer provided to the spectral analyzer is somewhat limited. A two-dimensional spectrometer can provide much greater amounts of information to the spectral analyzer. However, the drawback of two-dimensional analyzers is that they are fairly large in size. Generally, they are so large in size that they cannot be housed within the housing containing the LIBS system, especially if that LIBS system is a handheld LIBS system.

SUMMARY

A two-dimensional spectrometer includes a first mirror, a prism, a diffraction grating, a lens, a second mirror, and a two-dimensional sensor. The first mirror is configured to receive the optical signal from the optical entrance and reflect the optical signal towards the prism. After passing through the prism, the optical signal is provided to the diffraction grating. The diffraction grating diffracts the optical signal so as to generate a diffracted optical signal which is directed back through to prism, wherein the lens configured focuses the diffracted optical signal onto the second mirror. The second mirror reflects the diffracted optical signal back through the lens which focuses the diffracted optical signal onto the two-dimensional sensor. The diffraction grating may be an echelle grating.

Further objects, features, and advantages of this invention will become readily apparent to persons skilled in the art after a review of the following description, with reference to the drawings and claims that are appended to and form a part of this specification.

DETAILED DESCRIPTION

Figure 1:
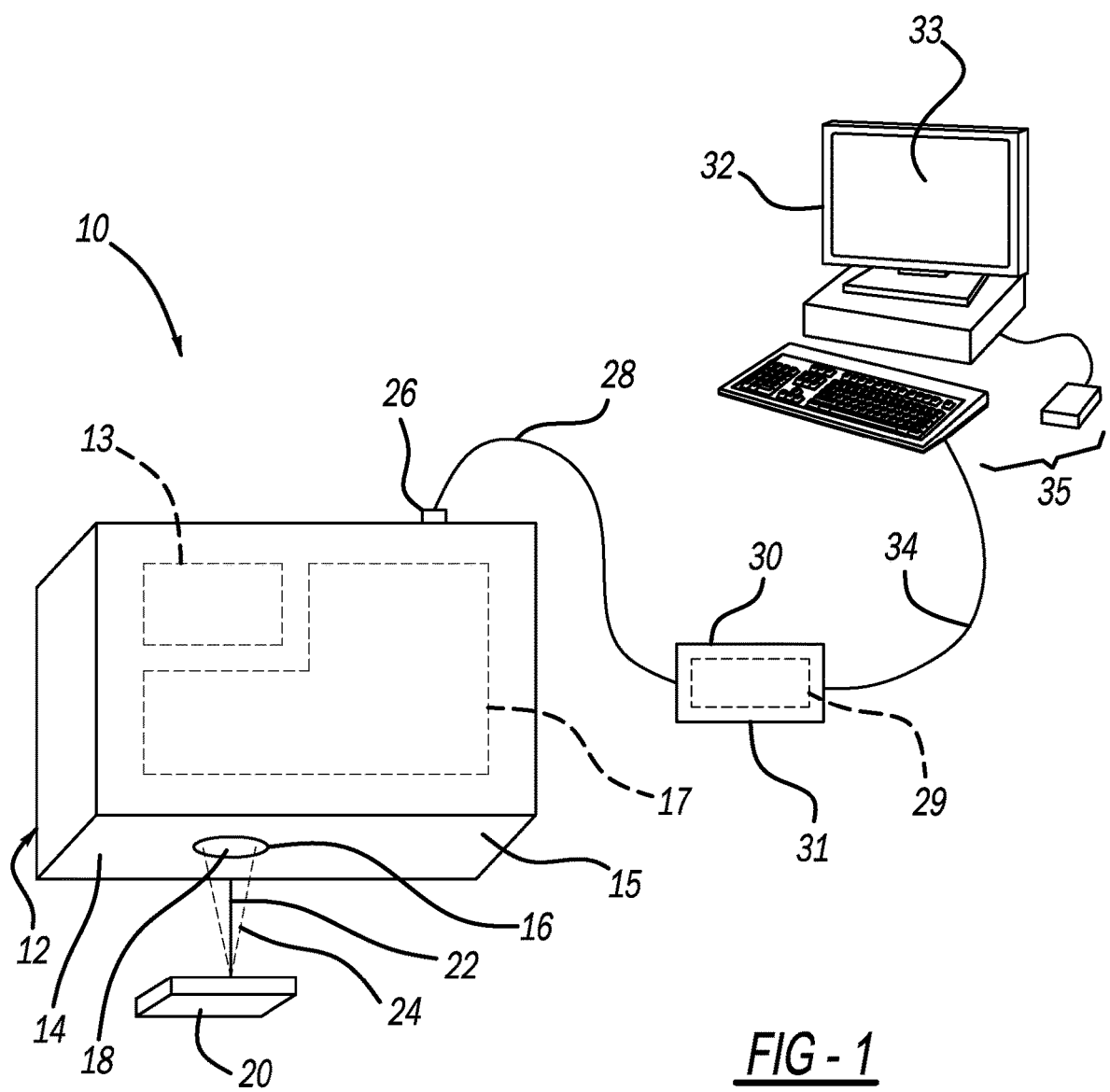
FIG. 1 illustrates a block diagram of a LIBS system having a spectrometer.

Referring to FIG. 1, a system 10 for analyzing the material composition of a sample 20 by spectrum analysis is shown. As its primary components, the system 10 includes a device 12 for analyzing the material composition of the sample 20. The sample 20 may be any sample capable of having its material composition analyzed. Here, the sample 20 may be carbon steel. The device 12 may by be similar to the device 12 shown and described in U.S. Pat. No. 9,645,088 which is herein incorporated by reference in its entirety.

The device 12 may include a housing 14 which may enclose a number of components that will be described in FIGS. 2A and 2B and later in this description. For example, the housing 14 may include a laser assembly 13 for producing a laser beam 22 and an optical assembly 17 for directing a laser beam 22 to the sample 20. In addition, the optical assembly 17 may function to direct plasma emitted light 24 (light reflected from the sample 20) to a spectrometer 30 via an optical fiber 28. The device 12 may be a handheld device.

The device 12 provides beam shaping and delivery for the laser beam 22 and also efficiently collects the plasma emitted light 24 from the plasma for delivery to the spectrometer 30. The laser beam 22 may be a single mode laser beam having a focused diameter of 20 microns on the sample 20 in order to generate a strong plasma plume. The working distance may be around or greater than 10 mm.

A wall portion 15 of the housing 14 may have an opening 16 formed therein. The opening 16 may contain a window 18. The window 18 may be a transparent window allowing for the transmission of light to and from the device 12, such as the laser beam 22 and the plasma emitted light 24. The housing 14 may be hermetically sealed and may be filled with an inert gas.

As stated before, the device 12 is configured to emit a laser beam 22 towards the sample 20. When the laser beam 22 strikes the sample 20, a plasma plume is formed and plasma emitted light 24 is reflected back to the window 18. As will be described in more detail in FIGS. 2A and 2B, the plasma emitted light 24 is redirected to the spectrometer 30 via the optical fiber 28. The fiber adapter 26 optically directs the plasma emitted light 24 to the optical fiber 28. The optical fiber 28, in turn, directs the plasma emitted light 24 to a spectrometer 30.

The spectrometer 30 may perform a number of different spectral analyses of the plasma emitted light 24 and converts these optical signals into electrical signals that are provided to digital analyzer 32.

The spectrometer 30 may include a monochromator (scanning) or a polychromator (non-scanning) and a photomultiplier or CCD (charge coupled device) detector, respectively. The spectrometer 30 collects electromagnetic radiation over the widest wavelength range possible, maximizing the number of emission lines detected for each particular element. The response of the spectrometer 30 may be from 1100 nm (near infrared) to 170 nm (deep ultraviolet).

The spectrometer 30 may be a two-dimensional spectrometer system 29 located within a housing 31. The spectrometer 30 has been designed so as to be as compact as possible, but also providing excellent resolution. For example, housing 31 of the spectrometer may have a volume of less than 1 liter and may even have a volume of less than 0.6 liters. As an example, the housing 31 may have dimensions of approximately 12.6 cm by 6 cm by 7.1 cm and weigh about 0.4 Kg. Because of this compact size of the spectrometer 30, the spectrometer 30 may be incorporated within the device 12 or may be located separately from the device 12 as shown.

The spectrometer 30 may have a spectral resolution that ranges from less than 0.025 nm at 193 nm to about 0.045 nm at 425 nm. As an example, the spectrometer 30 may be specifically designed as a high-resolution spectrometer generating two-dimensional images of LIBS spectra of materials within 180 to 500 nm range.

The electrical signals generated by the spectrometer 30 may be provided to the digital analyzer 32 by a cable 34. However, it should be understood that any one of a number of different methodologies utilized to transmit digital data from separate devices may be employed. For example, the digital analyzer 32 may utilize a wireless protocol to communicate with the spectrometer 30. The digital analyzer 32 may be a dedicated device having an output device 33 and one or more input devices 35. The output device 33 may be a display, while the input device 35 may be a keyboard and/or a mouse.

Figure 2A:
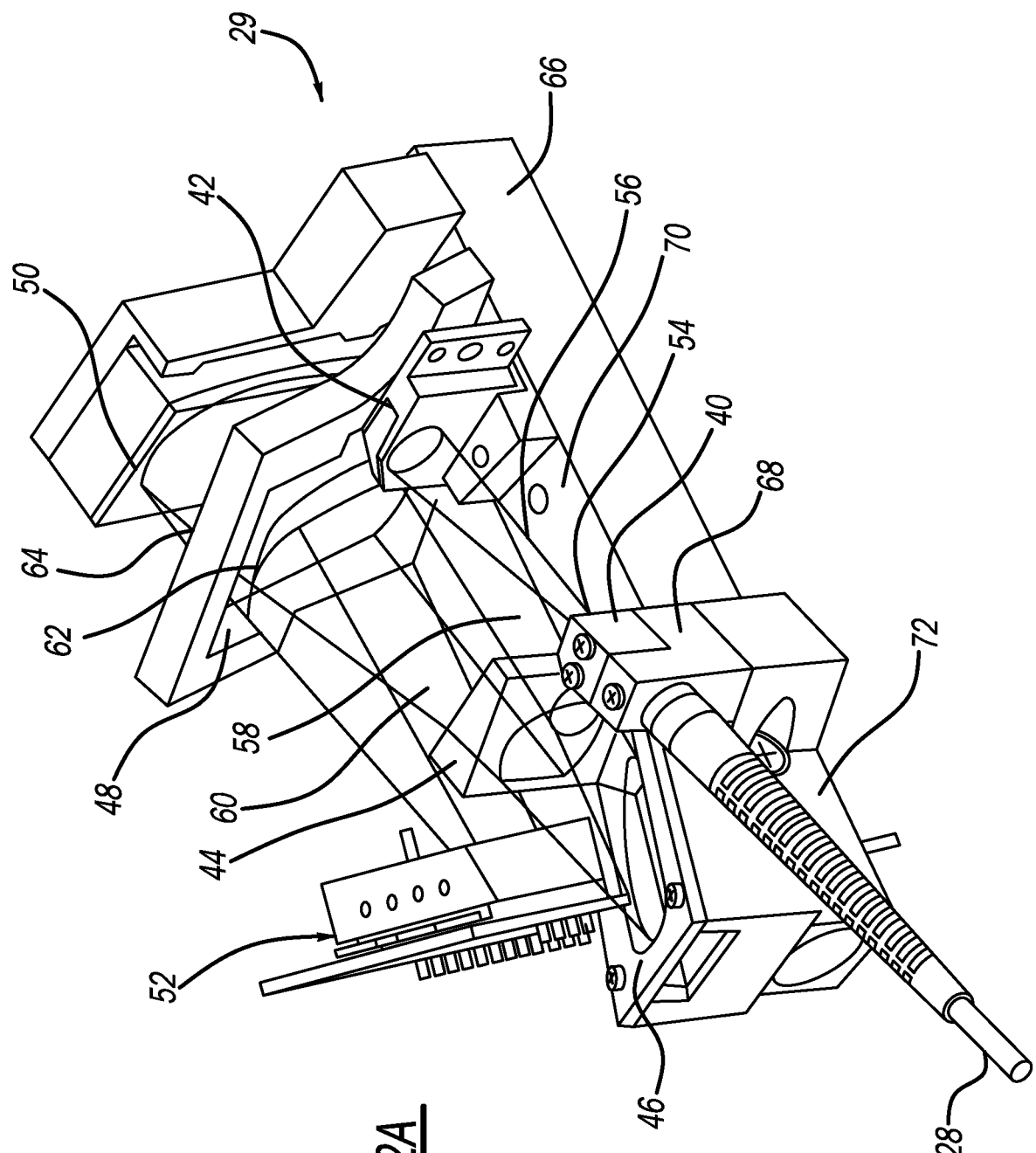
FIG. 2A illustrates the spectrometer of the LIBS system of FIG. 1.
Figure 2B:
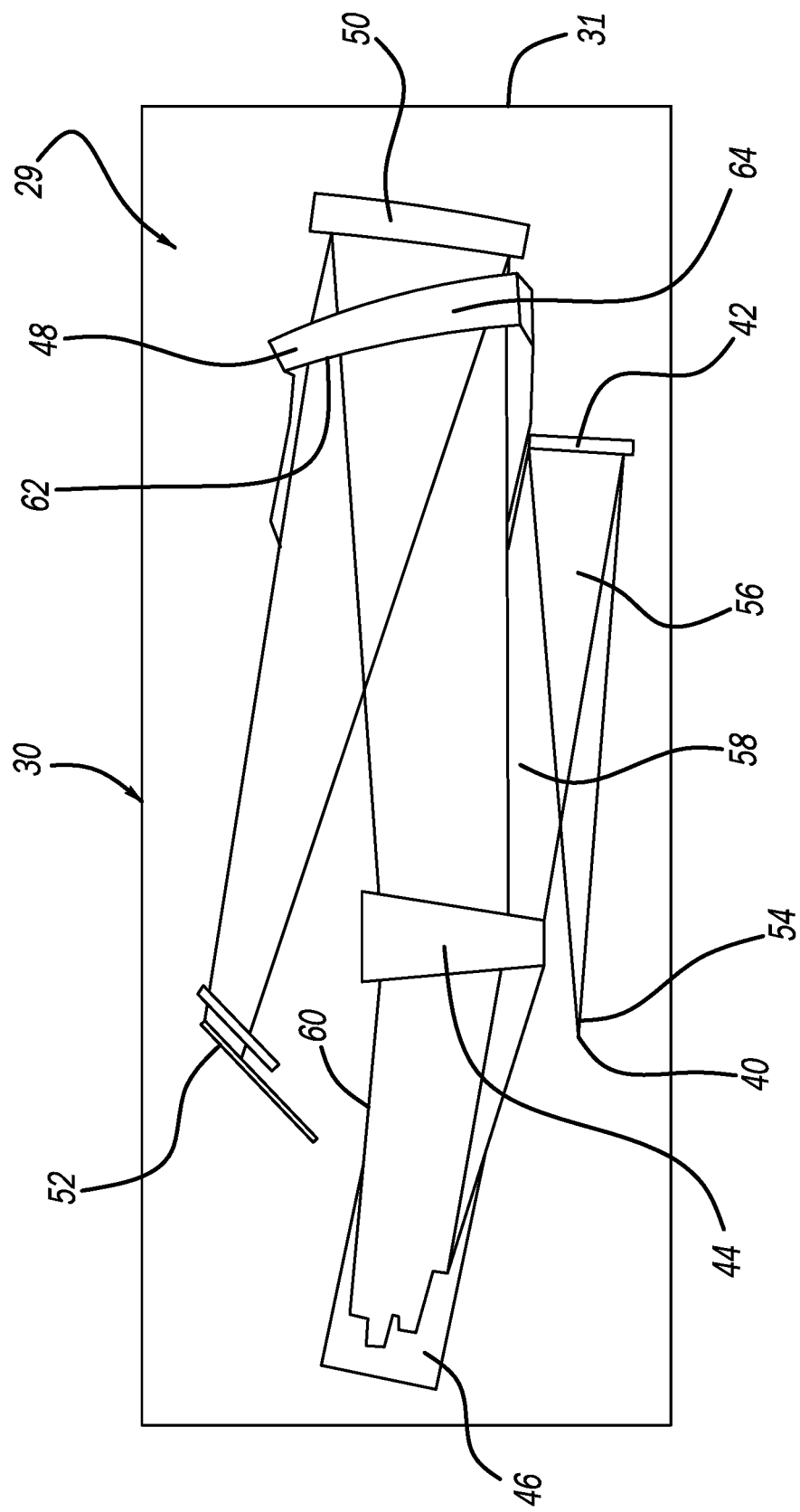
FIG. 2B illustrates a block diagram of the LIBS system of FIG. 2A.

Referring to FIGS. 2A and 2B, illustrations of the two-dimensional spectrometer system 29 are shown. FIG. 2A illustrates an actual figure of the two-dimensional spectrometer, while FIG. 2B illustrates a more simplified block diagram of the two-dimensional spectrometer system 29 for ease and understanding the components utilized in the two-dimensional spectrometer. For simplicity sake, reference to both figures will be made.

As its primary components, the spectrometer system 29 includes an optical entrance 40, a first mirror 42, a prism 44, a diffraction grating 46, a lens 48, a second mirror 50, and a two-dimensional sensor assembly 52.

The optical entrance 40 is configured to receive an optical signal. This optical signal may be provided via a fiber 28 and generated by the LIBS system 12 of cap figure numeral 1. The optical entrance may further comprise a slit 54 that is configured only to maximize the light provided by the fiber 28 that emanated from the device 12 of FIG. 1. The light entering the slit 40 from the optical fiber 28 travels along a first optical path 56 towards the first mirror 42. The first mirror 42 is configured to receive the optical signal and reflect the optical signal towards the prism 44. The first mirror 42 may be an off-axis parabolic mirror.

After being reflected by the first mirror 42, the optical signal travels along the optical path 58 towards the prism 44. The prism is configured to receive the optical signal and allow the optical signal to proceed towards the diffraction grating 46.

The diffraction grating 46 is configured to receive the optical signal from the prism and generate a diffracted optical signal 60. The diffraction grating 46 may be an echelle grating. The optical signal is first dispersed on the diffraction grating 46 in one plane and then again by another diffracting element which may be the prism 44. As such, light diffracted by the diffraction grating 46 is then provided back to the prism 44 to provide a second diffraction which takes place in a plane which is perpendicular to the plane of the first diffraction performed by the diffraction grating 46.

From the prism 44, the diffracted optical signal 60 is provided to the lens 48. The lens 48 may be a meniscus lens having two curved surfaces. The lens 48 may have an inwardly curved surface 62 and an outwardly curved surface 64. The inwardly curved surface is configured to receive the diffracted optical signal 60 from the prism. The outwardly curved surface 64 generally faces the second mirror 50. The inwardly curved surface 62 of the lens 48 may have a lower curvature than the outwardly curved surface 64 of the lens 48.

After passing through the lens 48, the diffracted optical signal 60 is provided to the second mirror 50. The second mirror 50 is configured to receive the diffracted optical signal 60 from the prism 44 through the lens 48 and then reflect the diffracted optical signal back to the lens 48. The second mirror 50 may be a parabolic or aspheric mirror. In the case that the mirror 50 is an aspheric mirror, the aspheric mirror may not be rotationally symmetric.

After being reflected by the second mirror 50, the diffracted optical signal 60 is then provided back to the lens 48 which then focuses the light towards the sensor assembly 52 which may be a two-dimensional sensor configured to receive the diffracted optical signal from the second mirror 50 via the lens 48.

As such, one can see that the optical signal that emanated from the optical entrance 40 and finally provided to the sensor assembly 52 is essentially folded three times. The first fold occurred by reflecting the optical signal by the first mirror 42. The second fold occurred by the diffraction of the optical signal by the diffraction grating 46. The third fold occurred by the second mirror 50 which reflected the optical signal back to the sensor assembly 52.

It is noted that the prism 44 and the lens 48 essentially perform two functions. The prism 44 diffracts the light provided to the diffraction grating 46 but also from the diffraction grating 46. The lens 48 focuses the diffracted optical signal from the prism 44 to the second mirror 50 but also functions to focus the light reflected by the second mirror 50 to the sensor assembly 52. By having the prism 44 and the lens 48 perform multiple optical operations, the spectrometer can be packaged within the housing 31 as previously described. Again, this housing may have a total volume of one liter or less and may be even smaller than 0.6 liters.

This compact spectrometer system 29 essentially allows the spectrometer system 29 to be placed in a very small packaging or could also be placed within the LIBS system 12 of FIG. 1. By so doing, this allows for a compact LIBS system that can perform both the laser-induced breakdown and also the spectrometer functionalities in a single handheld device. The first mirror 42, prism 44, diffraction grating 46, lens 48, second mirror 50, and sensor assembly 52 may all be mounted on a single beam 66. By so doing, the single beam 66 allows the components to be precisely placed. The single beam 66 may be made of invar which generally has material properties that are favorable to such a system, as invar has been known to maintain its shape under extreme thermal conditions. By maintaining its shape under extreme thermal conditions, the beam 66 cannot only support the previously mentioned elements but prevents and minimizes movement of the elements when operating.

A fiber coupler 68 that is configured to mate with the optical fiber 28 thereby allowing the optical signal 56 to be provided to the system 29 may also be mounted on the beam 66. In FIG. 2A, the beam 66 is shown as a rectangular prism having four separate sides. Here, a fiber coupler 68 is in optical communication with the slit of the optical entrance 40 and is configured to mate with the optical fiber 28 thereby allowing the optical signal 56 to be provided to the system 29 may also be mounted on the beam 66.

In FIG. 2A, the beam 66 is shown as a rectangular prism having four separate sides. Here, the first mirror 42, prism 44, diffracting grating 46, lens 48, second mirror 50, and sensor assembly 52 may all be located on a first side 70, while the fiber coupler 68 may be mounted to a second side 72. The second side 72 may define a plane that is substantially perpendicular to the plane defined to the first side 70.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A two-dimensional spectrometer, the two-dimensional spectrometer comprising:
   an optical entrance for receiving an optical signal;
   a first mirror configured to receive the optical signal from the optical entrance;
   a prism configured to receive the optical signal reflected from the first mirror;
   a diffraction grating configured to receive the optical signal from the prism and generate a diffracted optical signal, the diffraction grating configured to direct the diffracted optical signal to the prism;
   a lens configured to focus the diffracted optical signal from the prism;
   a second mirror configured to receive the diffracted optical signal from the prism through the lens and reflect the diffracted optical signal back to the lens; and
   a two-dimensional sensor configured to receive the diffracted optical signal from the second mirror via the lens;
   further comprising a housing, wherein the first mirror, the prism, the lens, the second mirror, and the two-dimensional sensor are disposed within the housing;
   wherein the spectrometer is dimensioned to be handheld, including the housing having a volume of less than 0.6 liters;
   wherein a spectral resolution of the two-dimensional spectrometer ranges from 0.025 nm at 193 nm to about 0.045 nm at 425 nm; and
   wherein the spectrometer is configured as high-resolution for generating two-dimensional images of LIBS spectra of materials within 180 to 500 nm range.

2. The two-dimensional spectrometer of claim 1, wherein the housing has a mass of 0.4 kg or less.

3. The two-dimensional spectrometer of claim 1, wherein the optical entrance is a slit.

4. The two-dimensional spectrometer of claim 3, further comprising a fiber coupler in optical communication with the slit, the fiber coupler configured to connect to an optical fiber carrying the optical signal.

5. The two-dimensional spectrometer of claim 1, wherein the first mirror is an off-axis parabolic mirror.

6. The two-dimensional spectrometer of claim 1, wherein the diffraction grating is an echelle grating.

7. The two-dimensional spectrometer of claim 1, wherein the lens is a meniscus lens.

8. The two-dimensional spectrometer of claim 7, wherein the meniscus lens has an inwardly curved surface and an outwardly curved surface, wherein the inwardly curved surface is configured to receive the diffracted optical signal from the prism.

9. The two-dimensional spectrometer of claim 8, wherein the outwardly curved surface of the meniscus lens substantially faces the second mirror.

10. The two-dimensional spectrometer of claim 8, wherein the inwardly curved surface of the meniscus lens has a lower curvature than the outwardly curved surface of the meniscus lens.

11. The two-dimensional spectrometer of claim 1, wherein the second mirror is an aspheric mirror.

12. The two-dimensional spectrometer of claim 11, wherein the aspheric mirror is not rotationally symmetric.

13. The two-dimensional spectrometer of claim 1, further comprising a support beam, wherein the first mirror, the prism, the lens, the second mirror, and the two-dimensional sensor are supported by a first surface of the support beam.

14. The two-dimensional spectrometer of claim 13, further comprising a fiber coupler in optical communication with the optical entrance, the fiber coupler being mounted to a second surface of the support beam, wherein the second surface of the support beam defines a plane that is substantially perpendicular to a plane defined by the first surface.

15. The two-dimensional spectrometer of claim 13, wherein the support beam is made on invar.

16. The two-dimensional spectrometer of claim 1, wherein the optical entrance for receiving an optical signal is configured to be optically coupled to a laser-induced breakdown spectrometry system.

17. The two-dimensional spectrometer of claim 1, wherein an optical path from the optical entrance to the two-dimensional sensor is folded three times, the first fold comprising reflection for an optical signal by the first mirror, the second fold comprising diffraction for the optical signal by the diffraction grating, and the third fold comprising reflection of the optical signal by the second mirror to the sensor.

* * * * *